United States Patent Office 3,127,374
Patented Mar. 31, 1964

3,127,374
PROCESS FOR THE PRODUCTION OF POLY-
VALENT MACROMOLECULAR ACIDS
Werner Kern, Rolf Schulz, and Irmela Löflund, Mainz,
Germany, assignors to Deutsche Gold- und Silber-
Scheideanstalt vormals Roessler, Frankfurt am Main,
Germany
No Drawing. Filed Jan. 29, 1959, Ser. No. 789,802
Claims priority, application Germany Jan. 31, 1958
4 Claims. (Cl. 260—67)

This invention relates to a process for the production of polyvalent macromolecular acids. More particularly it relates to the production of macromolecular polyacrylic acids.

French Patent 1,147,483 describes the conversion of polyacroleins to polymeric aldehyde derivatives. According to the process disclosed in that patent, polyacrolein acetals, polyacrolein mercaptals, polyacrolein oximes, polyacrolein bisulfite addition compounds, for example, and others can be thereby produced.

In addition, it is also well known that low molecular weight aldehydes can be oxidized to the corresponding acids by suitable oxidizing agents. Gilbert and Donleavy (J. Amer. Chem. Soc. 60, 1911 (1938)) oxidized a polymer produced by a Michael condensation of acrolein using alkaline potassium permanganate as the oxidizing agent. However, the polyacrolein produced by this procedure only had a molecular weight of between 370 and 580. As such, the polymeric acids subsequently formed from these relatively low molecular weight polyacroleins can only be referred to as oligomeric acrylic acids. U.S. Patent 2,554,973 discloses the production of oligomeric acroleins, for example, a polymer having an average of 4.3 acrolein units per molecule, by the thermal treatment of acrolein in the presence of hydroquinone. Such polyacroleins can be oxidized to acids with simultaneous partial hydrolysis.

The object of the present invention is to provide a process for the oxidation of macromolecular polyacroleins whereby water soluble polymeric acids can be produced.

The reduction-oxidation (redox) polymerizates of the acroleins, which are insoluble in water as well as in organic solvents, can, for example, be used as the starting material for the process according to the invention. The gram molecular weight of these acrolein polymers lies between 5000 and 300,000. It is also possible to employ the polyacrolein-sulfurous acid solutions produced according to French Patent 1,147,483 as starting materials.

In carrying out the process according to the invention, the oxidizing agent and the reaction conditions must be so selected that a secondary decomposition of the polymeric acids produced is avoided. For example, it is well known that polyacrylic acids are unstable in alkaline mediums. For the process according to the invention it is most expedient to employ dilute aqueous solutions of peracetic acid at temperatures of 60 to 100° C. Instead of peracetic acid, a mixture of glacial acetic acid and hydrogen peroxide, which is then diluted with water, can be used. Dilute solutions of performic acid or perbutyric acid can also be used. The polyacrolein goes into solution in the course of 10 to 100 minutes, depending on the concentration conditions. Under these conditions the viscosity of the resulting solution does not change noticeably even after operating for several hours at 80° C. The oxidizing agents are preferably used in such concentrations, that the content of active oxygen is from 12 g. to 80 g. per 56 g. polyacrolein.

The reaction solution can be processed in various ways. For example, the excess oxidizing agent or the reduction products can be separated by dialysis or by ion exchange. The solid polymeric acids are obtained, for example, by freeze-drying (lyophile process). The acids produced according to the invention contain 70–80 mol percent carboxyl groups and exhibit typical polyelectrolyte viscosity behavior in aqueous solutions. The polymerization degree of the polyacrylic acids depends on the polymerization degree of the polyacrolein employed as starting material.

The polymeric acids thus obtained are soluble in water, methanol, formamide and dimethyl formamide. They are insoluble in dioxane, tetrahydrofurane and γ-butyrolactone.

The polymers produced according to the invention can be salted out from the aqueous solution by concentrated solutions of neutral salts. Also, aqueous solutions will yield insoluble precipitates with polyethyleneimine, solutions of lead acetate, silver nitrate, copper salts, calcium salts and barium salts.

The polymeric acids can be used as protective colloids, thickening agents, sizing agents or finishes, for example, in the textile, paper or leather industries.

*Example 1*

5 ml. of 45% peracetic acid were diluted with 45 ml. of water and mixed with 1 gr. of polyacrolein, which had been produced by a redox polymerization of monomeric acrolein in the presence of persulfate and silver nitrate and which had a molecular weight of about 7000.

The suspension was warmed up to 80° C. and a clear solution was obtained after 1½ hours. The acetic acid thus formed and the excess peracetic acid were separated by dialysis. The polymeric acids were recovered as white, somewhat hygroscopic substances by freeze-drying. The yield was 80%. The carboxyl group content of the polymer thus produced was 76 mol percent.

*Example 2*

The reaction mixture produced according to Example 1 was mixed with about 5 gr. of a strongly basic anion exchanger in the OH form, for example, Dowex 2. This anion exchanger consists essentially of a polystyrene resin with quaternary benzylammonium groups. After about ½ hour the decomposition of the excess peracetic acid was ended as could be ascertained by a slackening of the evolution of the gases produced. The mixture was then percolated through a column filled with the above mentioned anion exchanger. The resulting strongly acid solution could be neutralized by the addition of alkalis or could be adjusted to a desired pH value.

We claim:
1. A process for the production of macromolecular polyacrylic acids which comprises treating a polyacrolein having a molecular weight of at least 5000 at a temperature between 60 and 100° C. with a dilute aqueous solution of, as an oxidizing agent, a lower peralkanoic acid.
2. The process of claim 1 in which the quantity of said oxidizing agent is such as to provide an active oxygen content of approximately 12 to 80 g. for about every 56 g. of the polyacrolein treated.

3. A solid, macromolecular oxidation product of macromolecular polyacrolein having a molecular weight of at least 5000, said oxidation product containing 70–80 mol percent carboxyl groups, said oxidation product being soluble in water, methanol, formamide and dimethyl formamide and said oxidation product being insoluble in dioxane, tetrahydrofurane and γ-butyrolactone.

4. The process of claim 1 in which said lower peralkanoic acid is peracetic acid.

References Cited in the file of this patent

UNITED STATES PATENTS 2,789,099 Rife et al. _____ Apr. 16, 1957

FOREIGN PATENTS 185,107 Great Britain _____ Nov. 30, 1922
1,147,483 France _____ Nov. 26, 1957

OTHER REFERENCES

J.A.C.S. 60, page 1911 (1938).